(12) United States Patent
Handa

(10) Patent No.: US 7,735,528 B2
(45) Date of Patent: Jun. 15, 2010

(54) HIGH PRESSURE GAS TANK COOLING BY EJECTOR PUMP CIRCULATION

(76) Inventor: Kiyoshi Handa, Honda R&D Americas, Inc. 21001 State Route 739, Raymond, OH (US) 43067-9705

( * ) Notice: Subject to any disclaimer, the term of this patent is extended or adjusted under 35 U.S.C. 154(b) by 653 days.

(21) Appl. No.: 11/682,574

(22) Filed: Mar. 6, 2007

(65) Prior Publication Data

US 2007/0261756 A1    Nov. 15, 2007

Related U.S. Application Data

(63) Continuation-in-part of application No. 11/381,005, filed on May 1, 2006, and a continuation-in-part of application No. 11/380,996, filed on May 1, 2006, and a continuation-in-part of application No. 11/380,429, filed on Apr. 27, 2006, now Pat. No. 7,637,292, and a continuation-in-part of application No. 11/279,574, filed on Apr. 13, 2006, now Pat. No. 7,377,294.

(51) Int. Cl.
    *B65B 1/04* (2006.01)
(52) U.S. Cl. ...................................... 141/82

(58) Field of Classification Search .................. 141/82, 141/2, 18, 98, 286, 67; 62/50.1–50.5; 123/525; 137/255, 263; 272/146.1, 146.6
See application file for complete search history.

(56) References Cited

U.S. PATENT DOCUMENTS

| 5,370,159 A | 12/1994 | Price |
| 7,377,294 B2 * | 5/2008 | Handa ......................... 141/82 |
| 2007/0000561 A1 | 1/2007 | Handa |

FOREIGN PATENT DOCUMENTS

EP        0936399 A1    8/1999

* cited by examiner

*Primary Examiner*—Steven O Douglas
(74) *Attorney, Agent, or Firm*—Mark E. Duell; Porter, Wright, Morris & Arthur, LLP.

(57) ABSTRACT

Apparatus wherein the compression heat of refueling of a high pressure storage tank is evacuated from the interior of the tank in which a gas circulating within the tank passes through an ejector pump powered by the mechanical energy of the refueling gas as the gas traverses from the high pressure refuel depot to the storage tank and the circulating gas absorbs the refueling heat and carries the heat to a cooling system before the gas is introduced into the tank for storage.

20 Claims, 14 Drawing Sheets

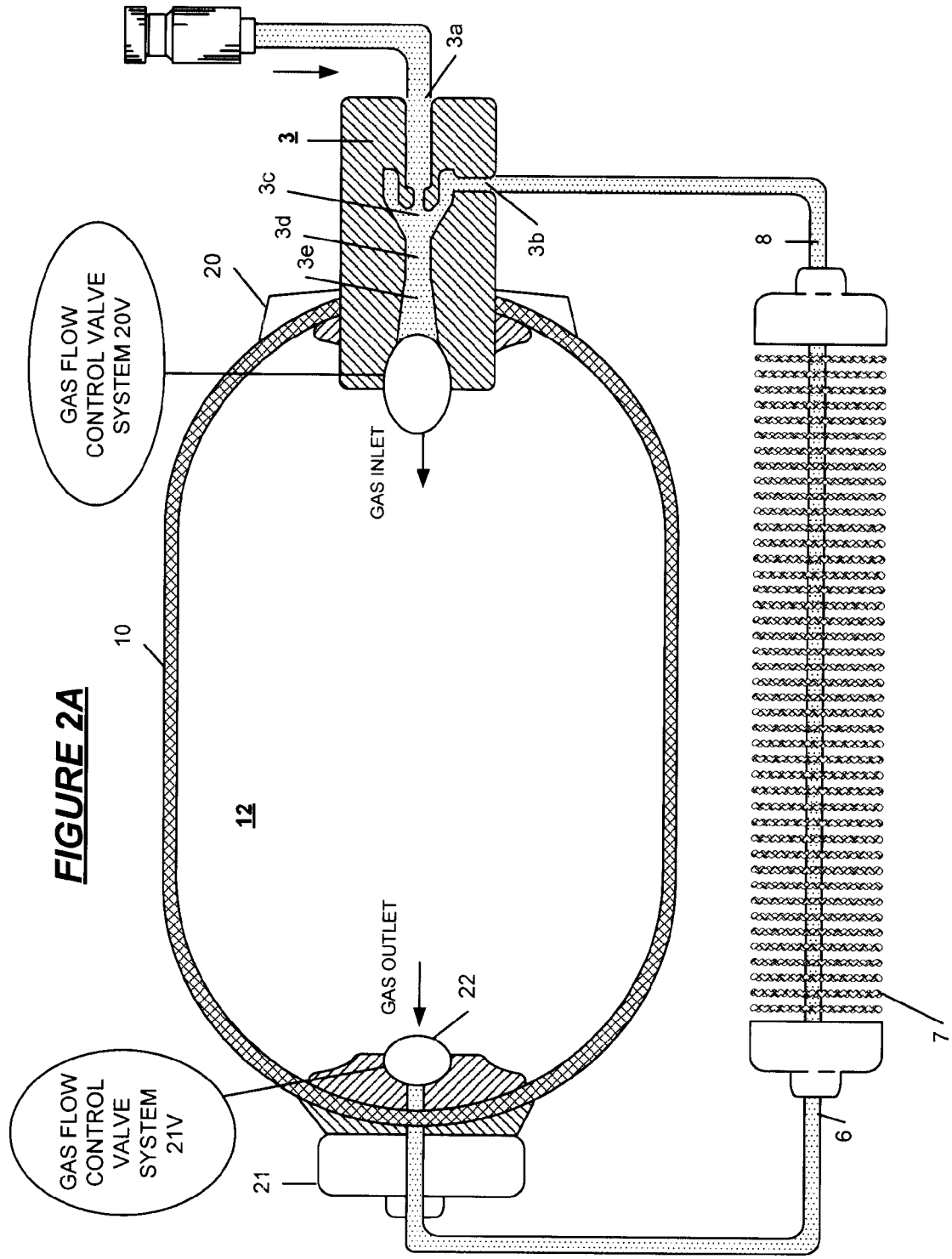

REFUELING

DRIVING

PARKING

HIGH PRESSURE GAS TANK COOLING BY EJECTOR PUMP CIRCULATION

RELATED APPLICATIONS

This application is a continuation in part of my co-pending applications for United States Letters Patent: Gas Cooling Methods for High Pressure Fuel Storage Tanks on Vehicles Powered by Compressed Natural Gas or Hydrogen, Ser. No. 11/279,574 filed on Apr. 13, 2006; Pressure Powered Cooling System for Enhancing the Refill Speed and Capacity of On Board High Pressure Vehicle Gas Storage Tanks, Ser. No. 11/380,429 filed on Apr. 27, 2006; Gas Cooling Method Using a Melting/Solidifying Media for High Pressure Storage Tanks for Compressed Natural Gas or Hydrogen, Ser. No. 11/381,005 filed on May 1, 2006; and System for Enhancing the Efficiency of High Pressure Storage Tanks for Compressed Natural Gas or Hydrogen, Ser. No. 11/380,996 filed on May 1, 2006.

FIELD OF THE INVENTION

The present invention relates to a system for efficiently cooling high pressure gas stored in fuel tanks, typically, hydrogen gas and compressed natural gas introduced to the tank at a refueling station. Onboard high pressure tank cooling is effected by direct gas ejecting using a Venturi pump.

BACKGROUND OF THE INVENTION

Typically, in motor vehicles using hydrogen to power fuel cells or using hydrogen and compressed natural gas (CNG) to power internal combustion engines, present practice is that fuel is stored in on board tanks maintained at a maximum pressure in the range of about 5000 psi for hydrogen and 3600 psi for CNG. Higher pressures in the range of about 10,000 psi or more are anticipated as the use of hydrogen and CNG becomes more prevalent. The in situ techniques I have developed to the manage thermal energy differences between high pressure gas in a tank and the environment of the tank in a vehicle involve heat exchanger devices fixed within the tank (to absorb and radiate heat) operatively interconnected with an external heat exchanger (correlatively to radiate and absorb heat) in the sequence of the refill and exhaustion of the high pressure gas within the tank. The background of the invention is extensively detailed in my above referenced related applications, the content of which is incorporated herein by reference. Japanese application for patent JPN P2005-69329A describes a tank cooling method which returns the hot gas from vehicle tank to the station to cool down and send it into the vehicle tank again. However, the application describes basically an intermittent cooling method operative at selected circumstances which likely does not have a large cooling capacity. Further, using the method of JPN P2005-69329A, fuel stations are forced to modify or replace existing refueling equipment.

In the specification herein, reference to hydrogen storage tanks correlates with the use of the invention with CNG (compressed natural gas) storage tanks. For clarity, although hydrogen is principally referred to in the specification and examples, "hydrogen" is a term in most instances intended to be interchangeable with CNG and both are referred to as a "gas" or "high pressure gas." Both hydrogen and CNG are high pressure gases with which the invention is useful, typically, but not necessarily, in motor vehicle applications.

Conventionally, high pressure gas vehicle fuel tanks are cylindrical with hemispherical ends and are formed from reinforced fiber composite material (e.g., a carbon fiber exterior winding and an aluminum alloy/plastic interior liner) and, in their various designs, are capable of storing a charge of high pressure gas at an approximately 5000 psi for hydrogen and approximately 3600 psi for CNG, and up to 10,000 psi or more at a maximum rated pressure capacity at a defined temperature. Various designs for high pressure hydrogen refueling stations have been proposed to deal with refueling efficiencies. When the on board fuel tanks of a hydrogen powered vehicle are filled with hydrogen, the pressurized on board gas in the tanks may be characterized as having multiple forms of energy: 1) chemical energy associated with the hydrogen fuel itself (consumed in powering the vehicle), and 2) thermodynamic energy, namely, the mechanical, thermal and internal energy associated with the physics of high pressure refueling of a tank from sources of fuel at the high pressure gas refuel depot.

During a high pressure refueling process involving hydrogen and CNG fueled vehicles, gas within the interiors of the on board storage tanks become heated as a result of fuel gas compression when the tank pressure increases and other refueling parameters affect the refill. After refueling, the interior temperature of the gas within the tank and the pressure within the tank both decrease slowly as the fuel gas is consumed during vehicle operation. Conventionally, it is not possible to obtain a full refill tank pressure without pressure compensation during the course of refueling. The charge of fuel pressure input into and stored in the tank must be, at refill (because of the heating compression of the gas), initially in excess of the tank design pressure. Without pressure compensation (an initial overfill), vehicle mileage range is reduced because a full fill is not obtained. When higher optimum tank design pressures are encountered, this condition is exacerbated.

In one response to the overfill dilemma, a slower flow rate may be used during refill, which will result in a lower internal tank temperature, and higher pressure, and increased capacity over time. An undesirable consequence of a slower flow rate during refueling to avoid heat build up is self evident—a longer refueling time. Another solution proposes to cool the station fuel gas before the refueling gas is introduced into the tank; external pre-cooling, however, requires substantial energy, thereby reducing the overall efficiency of a hydrogen/CNG economy. Pre-cooling or other pre treatment of the high pressure refuel gas is generally unnecessary when fill pressures are at 5000 psi or lower, however, as pressures approach or exceed 10,000 psi, cooling (and its opposite, internal tank heating by compression) becomes an important factor in the refueling process.

A pressure overfill as an option likewise requires additional energy expense where additional gas compression is involved and further increases the heat generated in the tank as a result of high pressure compression during the refill process. In any case, secondary treatment of the refill gas is generally unnecessary when tank fill pressures are at 5000 psi or lower. As tank pressures exceed 3600 psi (for CNG) and 5000 psi and approach or exceed 10,000 psi (for hydrogen), secondary treatment such as cooling becomes an important factor in the refueling process to achieve a full tank capacity fill. When a full fill is achieved, 1) overall vehicle range per each tank refill thereby increases, 2) energy required for a refill (such as for precooling or a pressure overfill) is reduced, 3) time is saved, and 4) overall customer satisfaction increases.

OBJECTS OF THE INVENTION

It is an object of the present invention to minimize energy loss and increase refueling efficiency in hydrogen refilling systems when factored into the overall energy efficiency of an infrastructure of high pressure gas powered vehicles and fuel depots for the consumer dispensation of high pressure fuel. Typically, each time a vehicle is refueled with hydrogen, mechanical compression transforms into thermal energy and results in the heating of refueled gas in the tank, hence, it is an object of the invention to minimize tank heating and to increase the efficiency and refueling capacity of an on board fuel storage tank in a hydrogen powered motor vehicle. It is an object of the invention to minimize high pressure gas tank heating and to increase the efficiency and refueling capacity of an on board fuel storage tank in high pressure gas powered motor vehicles. It is an object of the invention to provide a system that can remove the compression heat resulting from refueling an on board tank during high pressure refueling. An avoidance of secondary gas cooling pretreatment and/or pressure overfill, a speedier refueling time, increased refueling efficiency, and an extension of overall vehicle range will result. Improved tank capacity per unit volume is achieved during refilling, particularly where nominal refill pressure is in the range of about 10,000 psi or greater for hydrogen and about 3,600 psi for CNG.

SUMMARY OF THE INVENTION

The invention provides a system that can remove the heat of compression resulting from the high pressure refueling of an on board vehicle tank. Refueling time will decrease and refueling efficiency and overall vehicle range will increase as a result of the improved tank capacity per unit volume achieved by the tank gas cooling system described herein. In accordance with the present invention, effective reduction of fuel tank heating during the refueling process is provided by introducing the refueling gas into an ejector pump that sucks out the hot gas from within the tank and in a circuit introduces the hot gas into a heat exchanger where the gas is then cooled down. The cooled gas and the refueling gas are mixed in the ejector and then both gas streams are directed into the vehicle storage tank.

The system described herein provides onboard cooling; as a result, there is no need to change the refueling station equipment. The cost and weight of on board gas cooling equipment, important factors in the adoption of high pressure fueled vehicles, are reduced; there is no internal heat exchanger in the confines of the tank. Cooling capacity is improved; continuous cooling is provided. Heat exchange efficiency approaches 100%. When there is an internal heat exchanger, the gas temperature in the heat exchanger is not perfectly equal to tank gas temperature, thus reducing internal heat exchanger efficiency to less than 100%. In the gas ejector system described herein, the gas flow cooling circuit is interconnected with an external heat radiator, thereby collecting interior tank heat and radiating the absorbed heat into the ambient atmosphere or other system appropriate for the use, radiation, absorption, or disposal of the collected heat of high pressure refueling.

In brief, the invention provides a system for reducing the energy and for reducing the time required to refill on board tanks on a vehicle from a high pressure fuel depot refilling line operatively interconnected to the tank wherein the refilling gas itself is circulated within the on board tank to absorb the compression heat of refueling, and the heat thereby absorbed, is radiated from the cooling circuit to an external environment before the fuel reaches the tank such that a close to optimum refill of the tank is achieved.

It is an object of the invention to provide a gas jet ejector wherein a Venturi pump utilizes the energy in the high pressure gas to create a lower pressure that can entrain another gas stream. A gas jet ejector has no moving parts and requires no maintenance thereby providing a distinct advantage over mechanical pumps. Reliability is achieved in that once the motive pressure is set, the ejector performance is maintained over a range of operating conditions. Shutdown and restart are possible without complication. The pump connections, nozzle inlet, suction inlet and throat outlet, provide the jet (Venturi) pump that is conveniently adaptable to a high pressure environment.

The invention is described more fully in the following description of the preferred embodiment considered in view of the drawings. As is evident from the context of the particular drawing figures, the figures are generally shown in cross section format:

BRIEF DESCRIPTION OF THE SEVERAL VIEWS OF THE DRAWINGS

FIG. 2A depicts an embodiment of the invention wherein outlets for gas flow are fixed at opposite ends of the tank and are operatively interconnected in a flow circuit to the refill depot, ejector pump, heat exchanger and the gas storage tank.

DETAILED DESCRIPTION OF THE INVENTION

The system of the invention increases the refueling energy efficiency of hydrogen powered vehicles by withdrawing the heat of refilling compression from the high pressure gas introduced into on board tanks and by eliminating the need for a slow fill, a pressure overfill and/or refueling station precooling of the gas. The refueling gas is introduced into an ejector pump that sucks out the hot gas from the tank interior; the hot gas transits through a heat exchanger where the gas is cooled down. Afterwards, the cooler gas and the refueling gas are mixed in the ejector and then introduced into the storage tank.

As a result, overall high pressure gas infrastructure energy requirements for motor vehicles are reduced, vehicle mileage range is increased, reducing the need for short interval refills, weight and cost are reduced, and consumer satisfaction is enhanced.

Figure 1A:
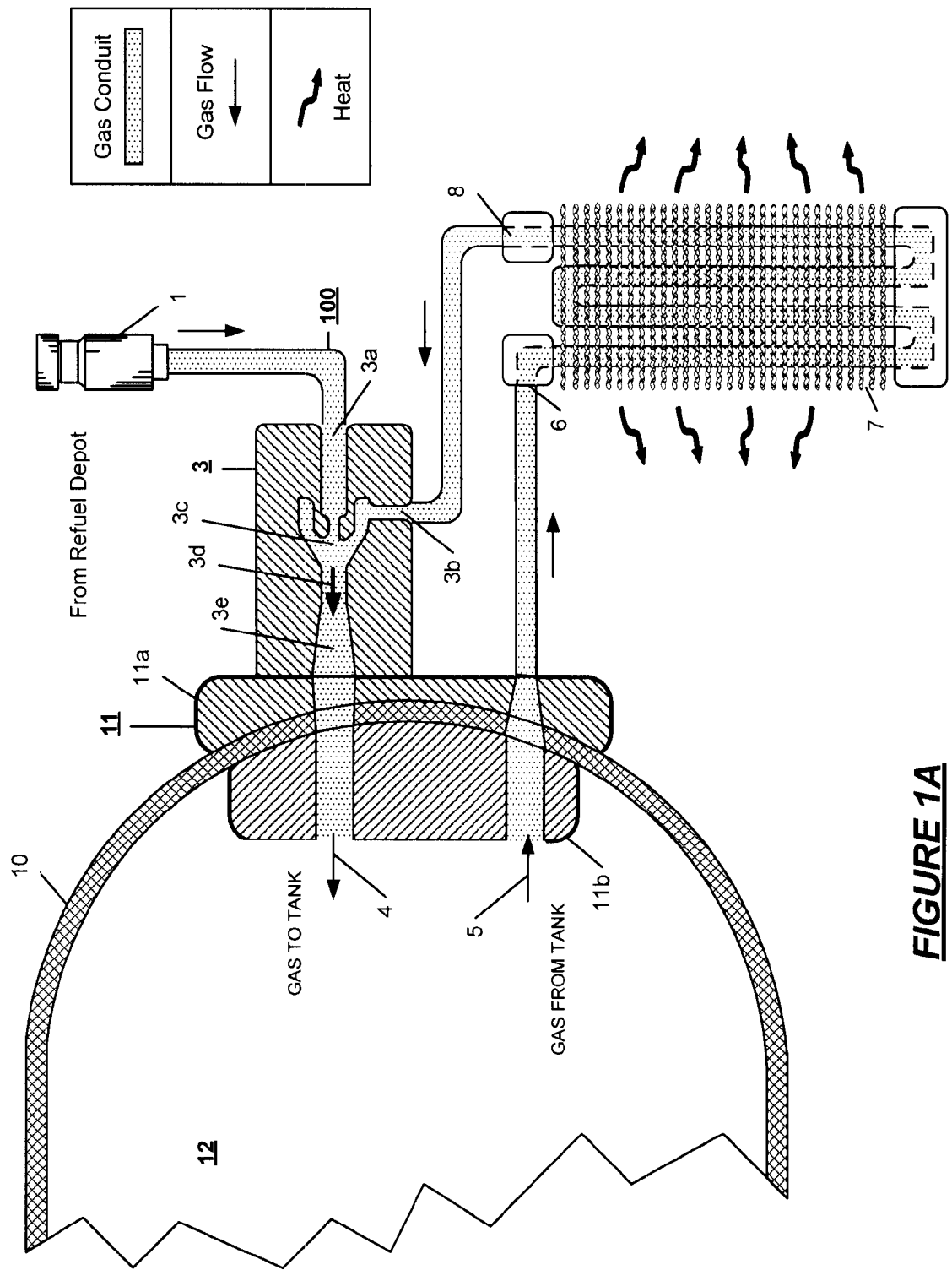
FIG. 1A is a representational diagram showing an example of a cooling system using an ejector pump fixed at one end of a fuel storage tank wherein gas flow is interconnected to a complimentary external radiator illustrating the principle of the invention.

With reference to FIG. 1A an example of a cooling system using an ejector pump fixed at one end cap or port assembly 11 of a fuel storage tank 10 is shown. Typically, the end cap is comprised of mating parts 11a and 11b with an ejector pump 3 disposed therein to provide a gas flow circuit in the system to and from the tank. Fuel depot receptacle 1 is interconnected with a control for gas flow into the vehicle tank during refill and insures that the system is otherwise closed at all other times. The master gas flow conduit system in the vehicle from the refuel inlet through the ejector pump and heat exchanger to the tank is indicated by 100. At refill, gas flow indicated by arrows → is introduced into ejector pump 3 which sucks up hot gas from the tank interior through gas flow outlet 5. Ejector pump 3 is configured to provide gas flow from the inlet 3a whereby jet chamber 3d follows the nozzle 3c that leads from the inlet 3a. The pump throat 3e is disposed to introduce gas from the pump into the tank interior through gas flow outlet 4 in the tank. The suction inlet for gas flow to the pump is shown at 3b. The gas flow is interconnected to inlet 6 of a complimentary external radiator or heat exchanger 7 and passes through outlet 8 returning to the ejector pump and flows to the tank interior 12 through outlet 4. A gas outlet for directing the flow of gas to the power plant is omitted from the drawings for clarity reasons. Heat disposal from the heat exchanger is indicated by the arrows ⇝. The compression heat of high pressure refill is thereby absorbed and radiated from the cooling/refueling circuit to an external environment such that a close to optimum refill of the tank is achieved without a slow fill, precooling or pressure overfill.

Figure 1B:
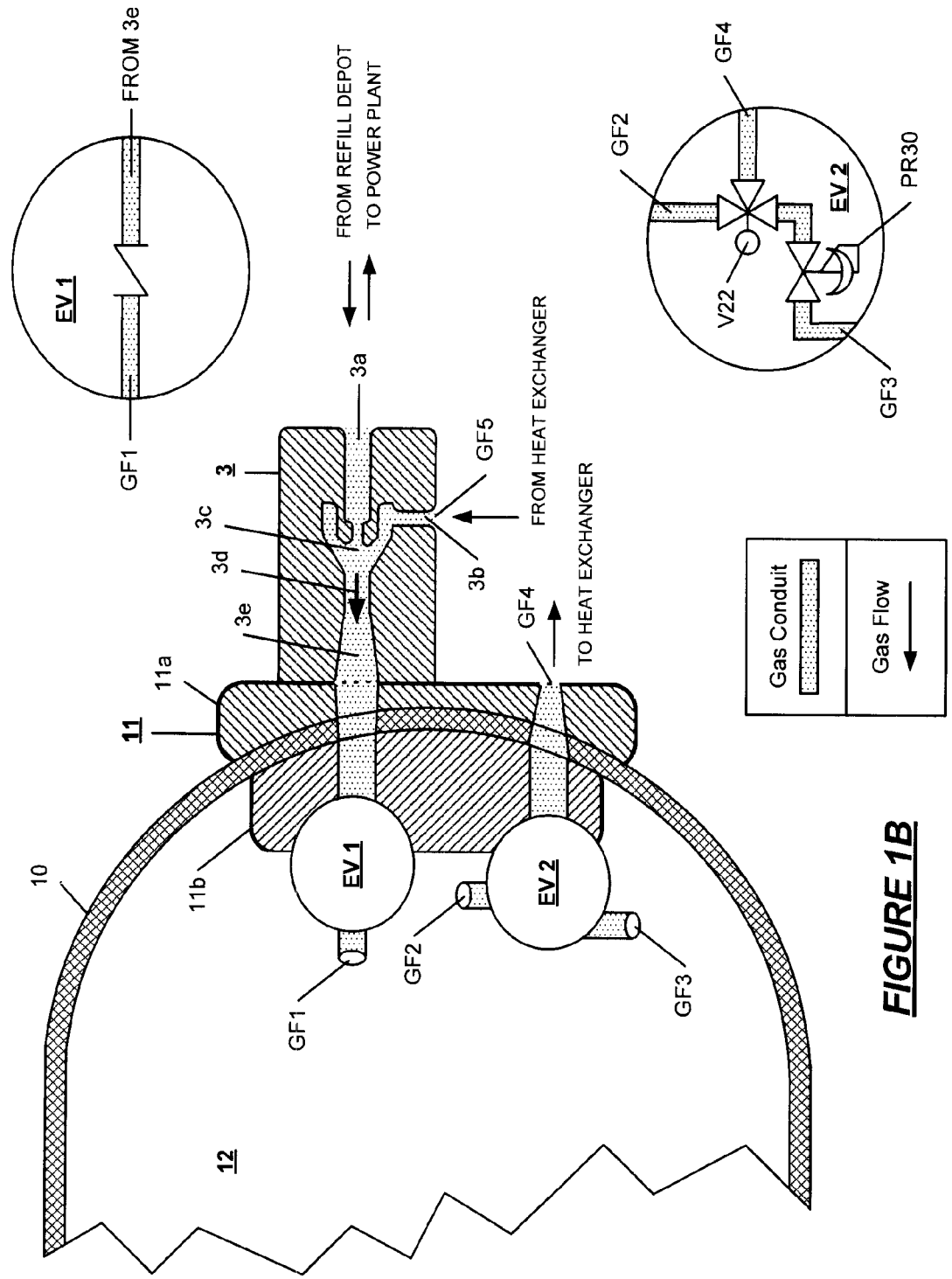
FIG. 1B depicts a further embodiment with an embedded valve system installed at one end of the tank.

Thus, onboard cooling is provided; as a result, there is no need to change the refueling station equipment. Parallel and series refills of a plurality of tanks may be effected. The cost and weight of on board gas cooling equipment, important factors in the adoption of high pressure fueled vehicles, are reduced; there is no internal heat exchanger in the confines of the tank. Cooling capacity is improved; continuous cooling is provided; and heat exchange efficiency approaches 100%. In FIG. 1B, the valves embedded in the single end cap of the embodiment are indicated as EV 1 and EV2.

As illustrated in FIG. 2A, adapting a port to each opposite end of the tank results in a simpler embodiment. In FIG. 2A, port assembly 21, opposite port assembly 20, provides a gas outlet 22, interconnected operatively with heat exchanger 7 in an overall ejector pump system equivalent in operation and gas flow properties to FIG. 1A and FIG. 1B. Gas flow control valve system 20V utilized at the end of the tank at boss 20 where the ejector pump is installed is equivalent to the valve system EV2 shown with respect to ejector pump flow control for GF2, GF3 and GF4 shown in FIG. 1B. Gas flow control valve system 21V utilized at the end of the tank at boss 21 is equivalent to the valve system EV1 shown with respect to flow control for GF1 shown in FIG. 1B.

Figure 2B:
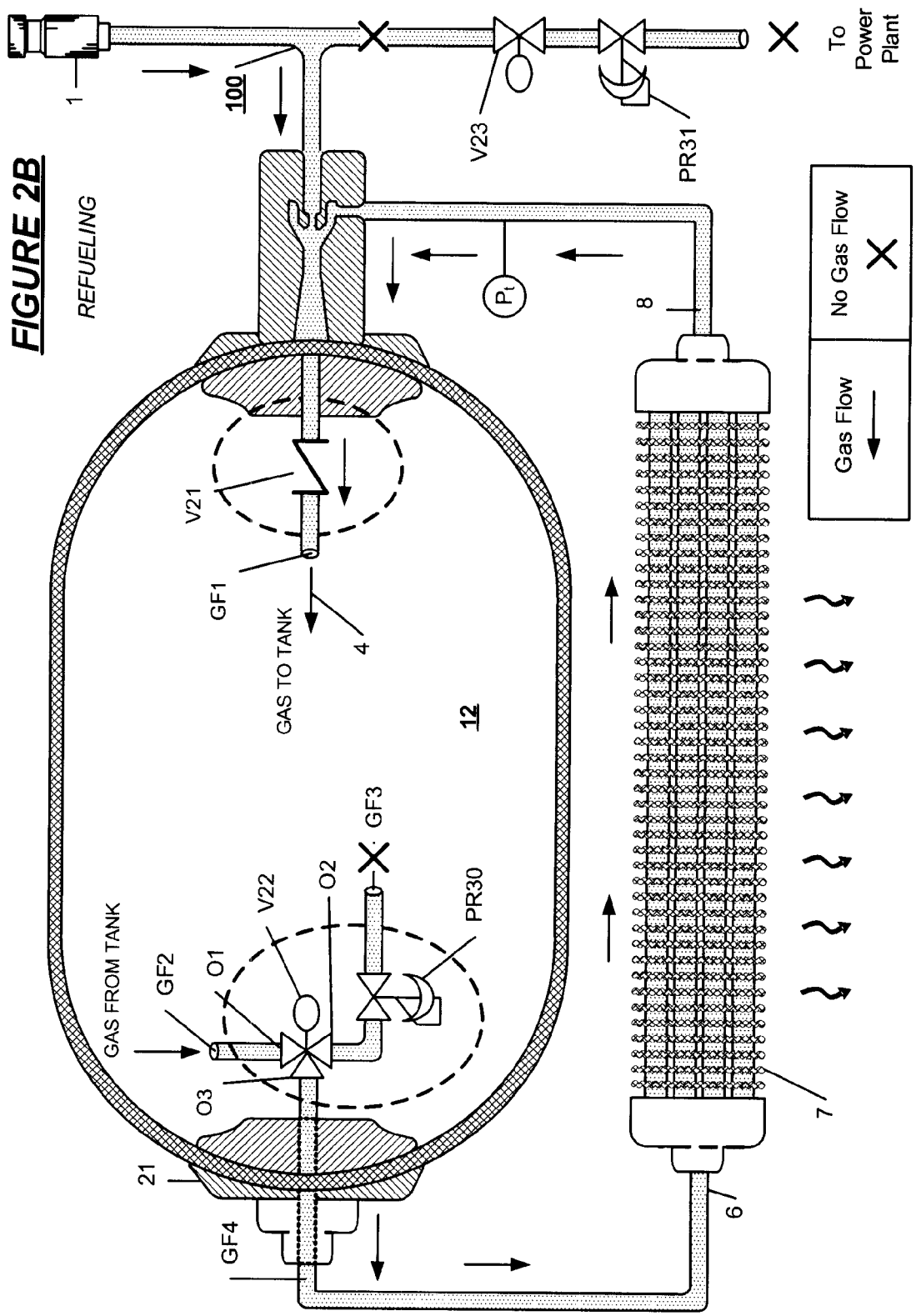
FIG. 2B depicts an embodiment of the invention showing valve configurations intrinsically positioned within the respective end caps at both ends of the tank interconnected in a flow circuit to the refill depot, ejector pump, heat exchanger and the gas storage tank during the state in which the tanks are refilled.
Figure 2C:
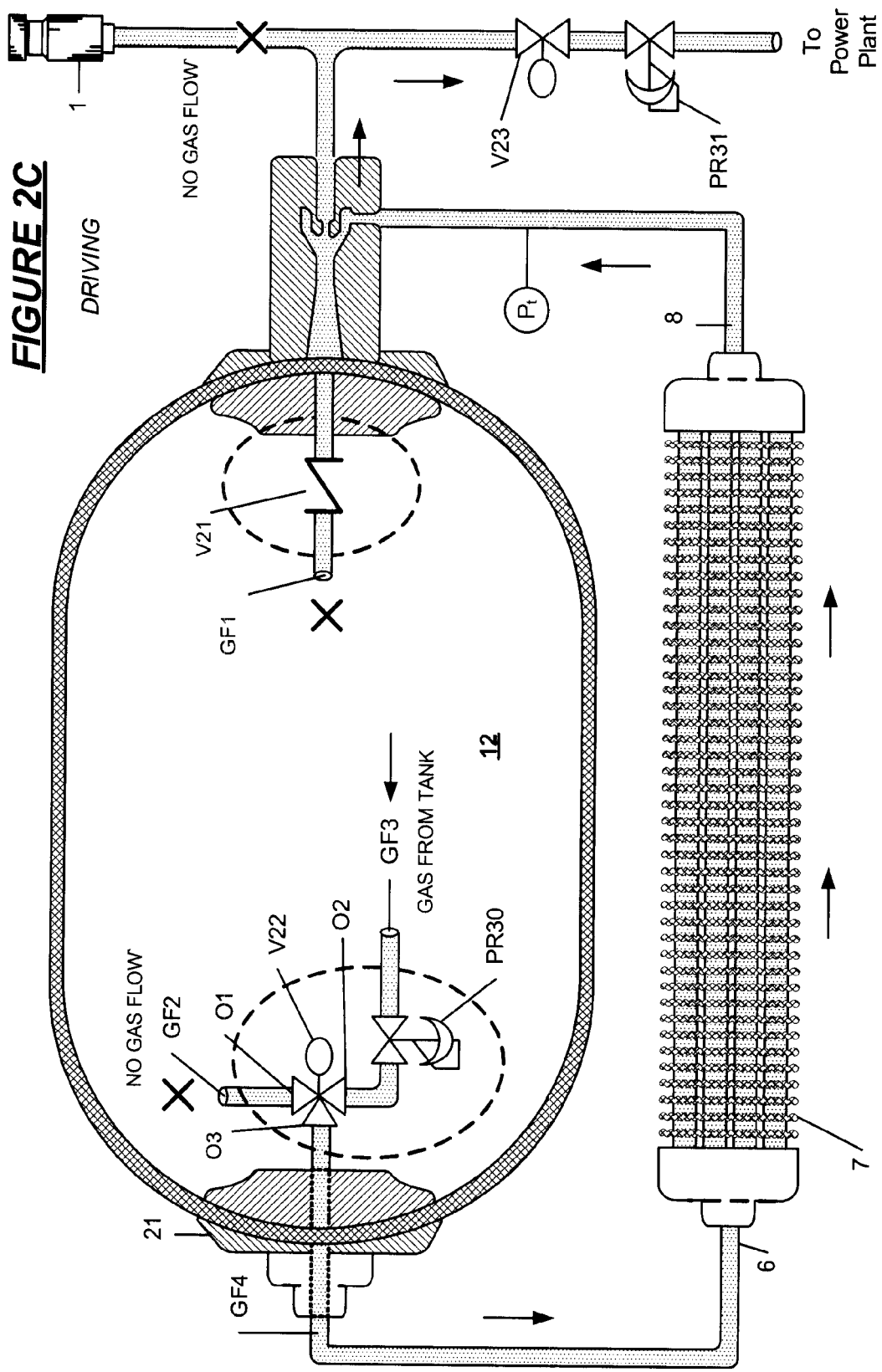
FIG. 2C depicts an embodiment of the invention showing valve configurations intrinsically positioned within the respective end caps at both ends of the tank interconnected in a flow circuit to the refill depot, ejector pump, heat exchanger and the gas storage tank during the state in which the tanks are exhausted (gas from the tank is consumed) during driving.
Figure 2D:
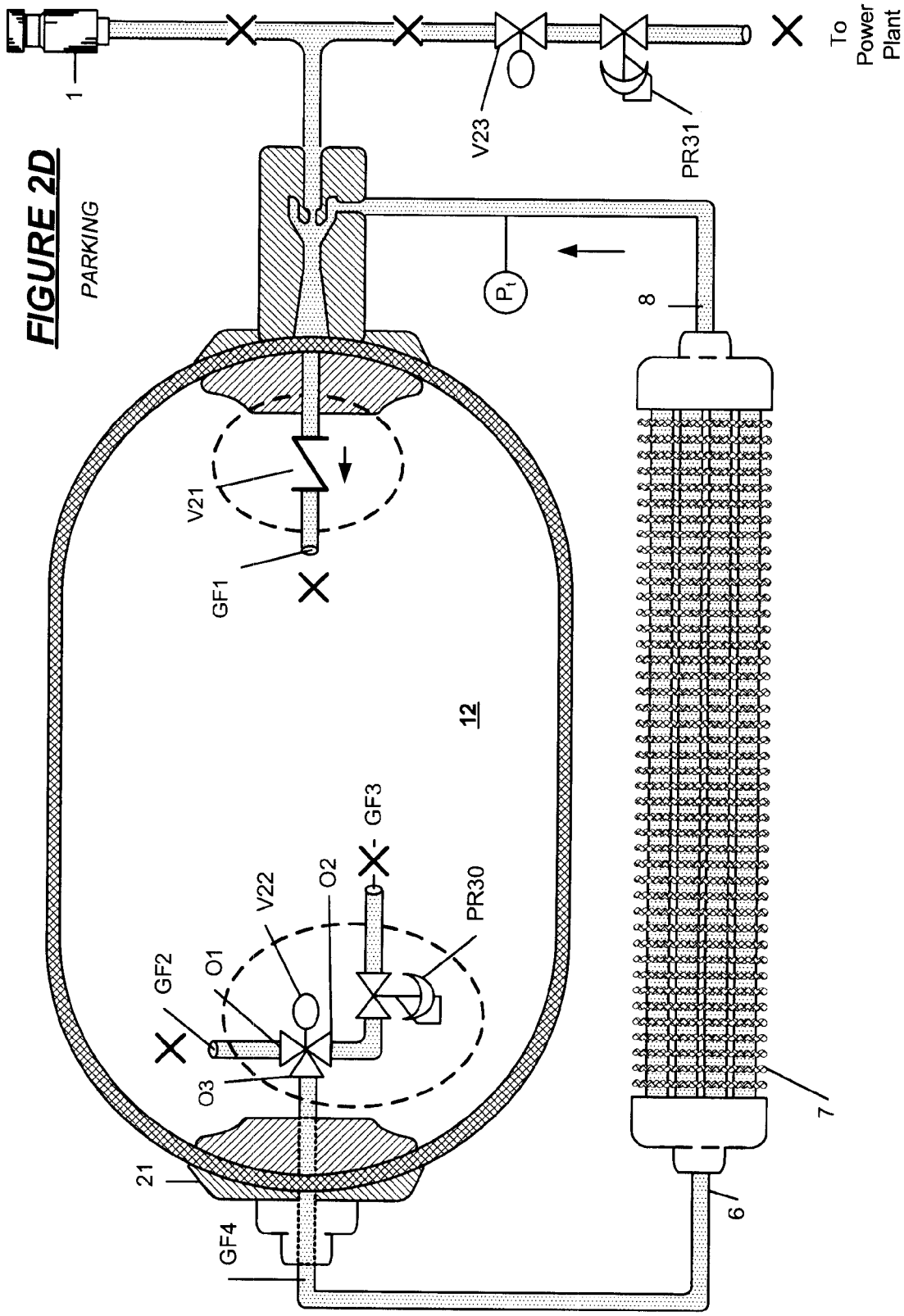
FIG. 2D depicts an embodiment of the invention showing valve configurations intrinsically positioned within the respective end caps at both ends of the tank interconnected in a flow circuit to the refill depot, ejector pump, heat exchanger and the gas storage tank during the state in which the vehicle is parked and the tanks are in a null state.

FIG. 2B, FIG. 2C and FIG. 2D illustrate the system, respectively, in the modes: refilling, driving and parking. In each of FIG. 2B, FIG. 2C and FIG. 2D, a valve/gas flow switching and pressure regulator is embedded in each of the end port assemblies 20 and 21. Heat exchanger 7, ejector pump 3 and its components, nozzle 3c, throat 3d and outlet 3e, and refill inlet system 1 are numerically designated as with equivalent elements shown similarly in FIG. 2A. In the refilling mode shown in FIG. 2B, port assembly 20 is provided at one end of the tank. Opposite port assembly 21, in the tank interior 12, includes check valve V21, a one way valve, embedded therein controlling gas flow GF1 into the tank from the ejector pump 3. Embedded in port assembly 21 are a two way switch valve V22 and pressure regulator PR30. Switch valve V23 and pressure regulator PR31 are interconnected in the gas flow conduit leading to the vehicle power plant. In the refuel mode, V23 is closed and the entry of gas from the nozzle 1 into the conduit 100 is allowed. Of the tubes associated with two way switch valve V22, O2 leading to the pressure regulator PR30 is closed; gas flow GF2 from inlet O1 passes through the valve outlet O3 to the tank exterior GF4 to the heat exchanger 7 to the ejector pump 3 where the refueling gas is circulated to remove heat from the tank interior 12. FIG. 2C illustrates the driving mode; low pressure operation occurs in the gas conduit tubes during driving. One way valve V21 is automatically closed because the ejector pump pressure is lower than pressure in the tank interior. There is no gas flow to the tank from the ejector pump 3. Valve V22 is switched open through outlet O3 allowing gas to flow GF3 through pressure regulator PR30 from the tank through the heat exchanger 7 and ejector pump 3 to the power plant through open valve V23 and serial pressure regulator PR31. After the $P_t$ shown reaches a point lower than a predetermined value, PR30 opens to maintain $P_t$ at a uniform value. Utilization of the lower pressure is safer than using high pressure in the gas conduit tubes. FIG. 2D illustrates the parking mode when all tank valves are closed.

Figure 3A:
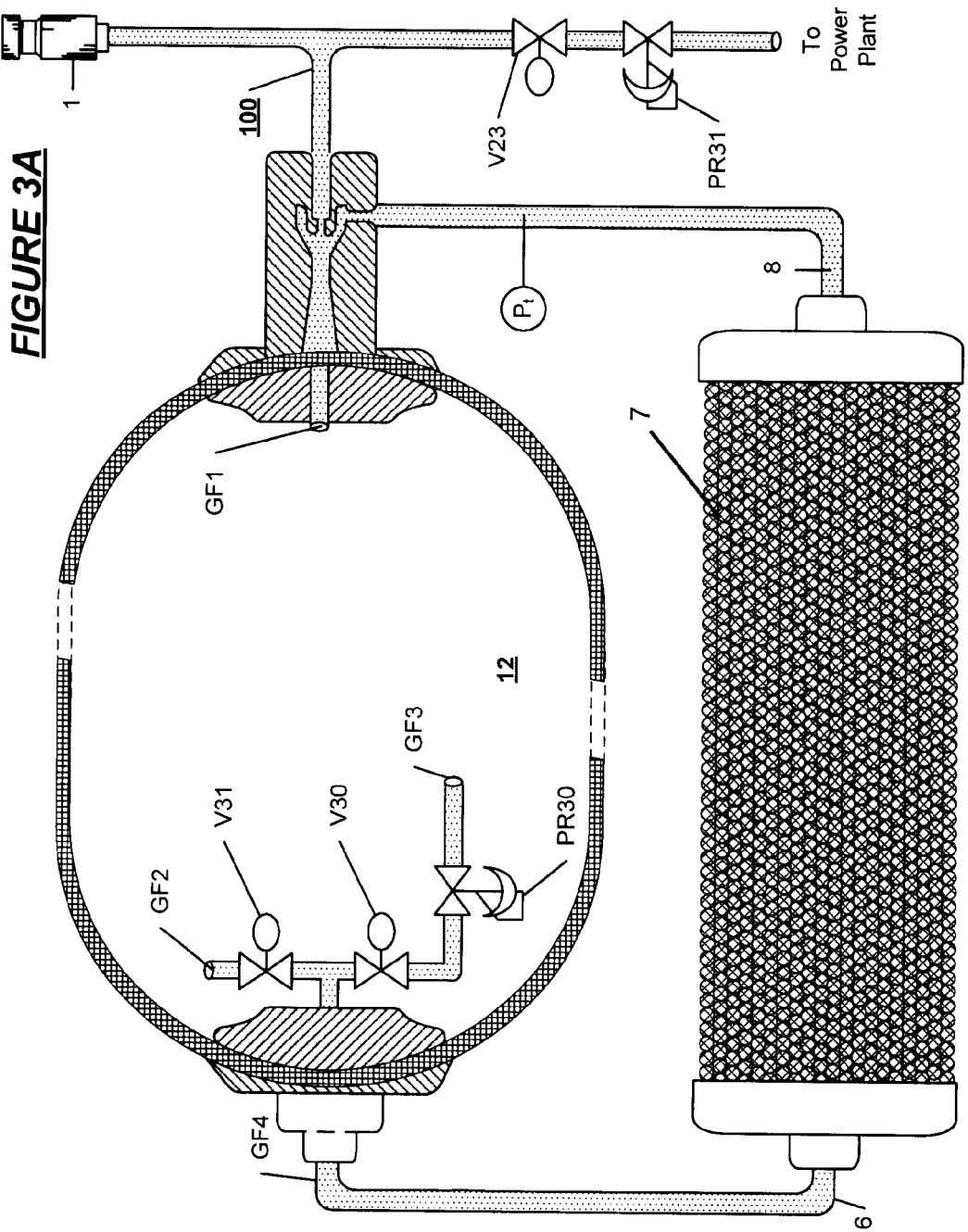
FIG. 3A depicts an alternate embodiment of the invention showing valve configurations intrinsically positioned within the respective end caps at both ends of the tank.
Figure 3B:
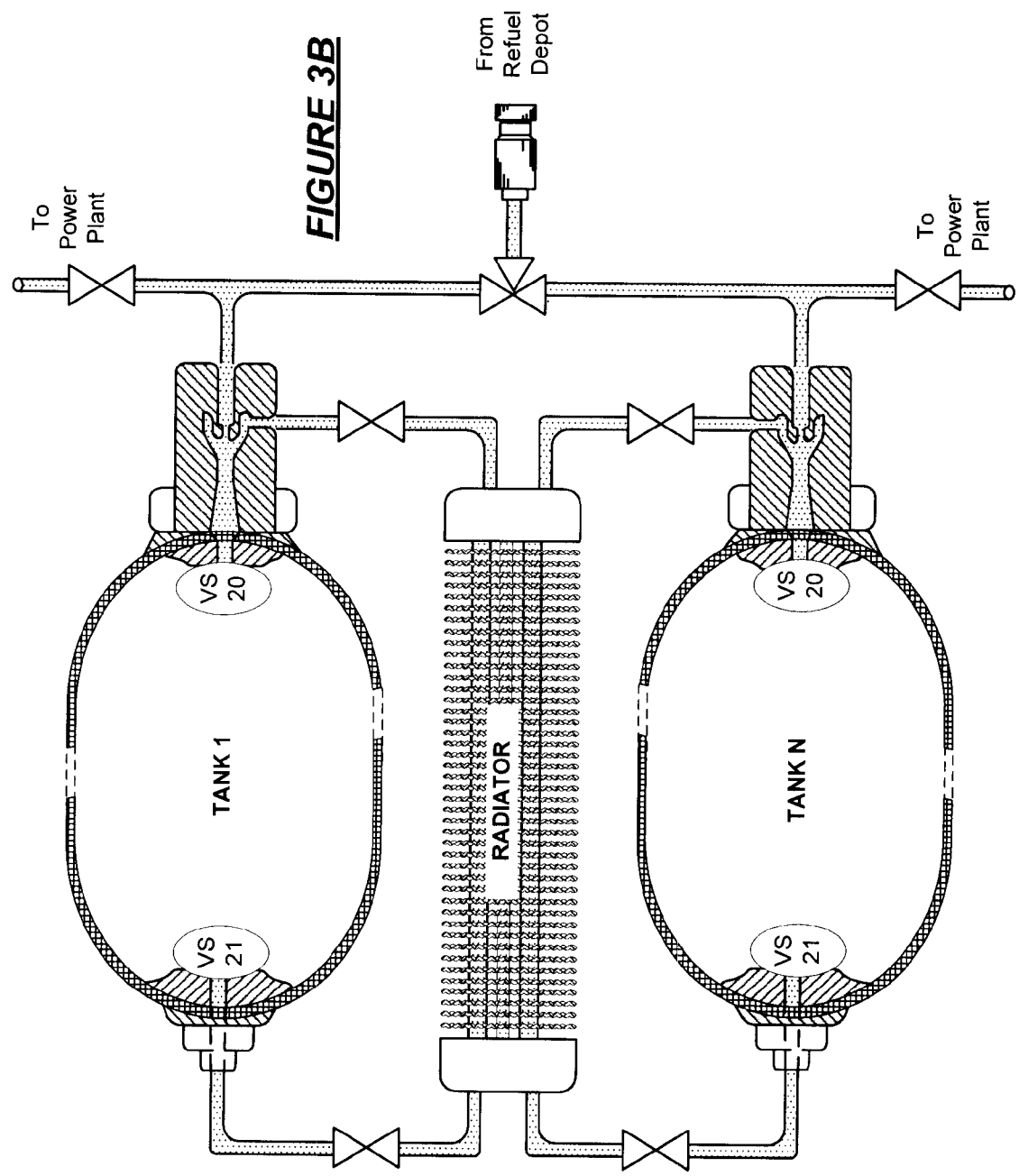
FIG. 3B depicts an embodiment of the invention showing multiple tanks with individual flow tubes passing through a radiator.
Figure 3C:
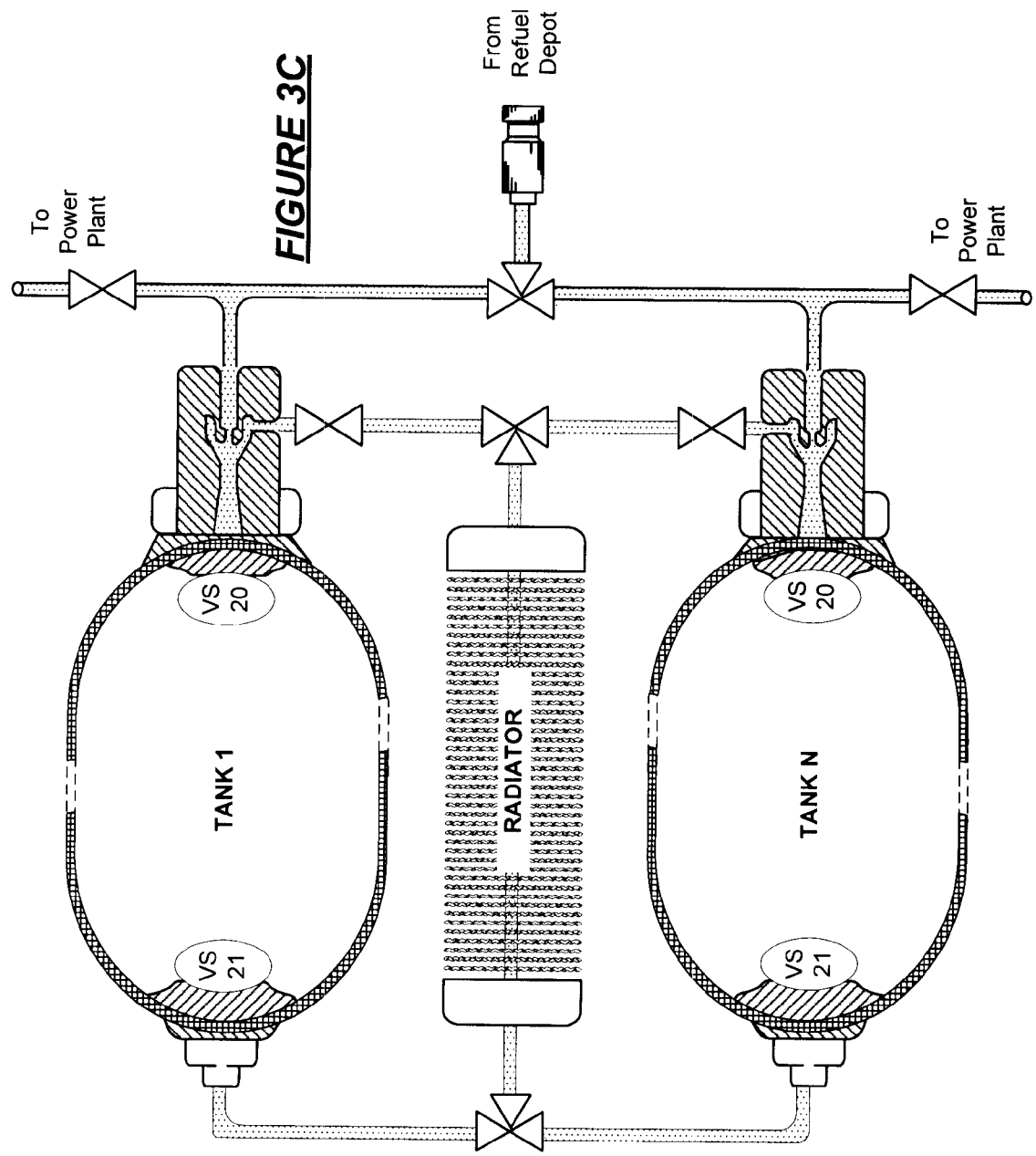
FIG. 3C depicts multiple tanks with a valve system allowing gas flow from each tank through a single radiator channel.

FIG. 3A shows an additional embodiment with a configuration of embedded valves in end port 21, V31 and V30 at the upper ends of a "T" controlling gas flow into and from the tank in conduit openings GF2, GF3 and GF4. FIG. 3B depicts an embodiment of the invention showing multiple tanks with individual flow tubes passing through a radiator. FIG. 3C depicts multiple tanks with a valve system allowing gas flow from each tank through a single radiator channel. In each of FIG. 3B and FIG. 3C, the valve systems controlling flow in the gas circuit of the examples are indicated as VS 20 and VS 21.

The heat exchanger may be in the form of a radiator and may include fins, pins, plates, wave shaped radiators, mesh, corrugation like elements, or other like devices having high thermal conductivity and high surface area per unit volume or weight, allowing for the maximum thermal efficiency with regard to heat absorbed and heat radiated as described in my co-pending applications. The heat sink and radiator are each operatively disposed with regard to a fluid conduit system for the transfer of captured heat. Entropic flow of energy is from hot (within the tank) to cool (the radiator outside). The fluid flow in the conduit system that is encompassed by the heat sink or radiator, in an example, is in a continuous fluid loop, from the hot tank interior where the gas captures heat—to the radiator where conduit fluid is cooled—returning to the tank interior to begin the heat absorption/heat radiation cycle anew.

A fan or blower may be operatively disposed with respect to the heat exchanger—operatively dependent on factors such as radiator capacity, rate of heat transfer to the heat sink and the radiator, temperature of heat transferred, fan or blower (cubic feet per minute (cfm)) capacity effective at the radiator, temperature of the ambient external environment, and the like. A control system for the fan and or pump may be configured to interrelate the foregoing factors and determine appropriate fan and or pump speed, on and off timing, and the like.

As with my previous applications noted above, the system is adaptable to multiple tanks and a vehicle control system providing selectable or controllable inlet valves and selectable or controllable outlet valves for the tanks and the coolant system operatively interconnected with a control means, logic circuit, or CPU on the vehicle. The vehicle control system also monitors pressure and/or temperature or other sensing means associated with the tanks or their inlet and outlet lines, the cooling fluid circulation lines, and the fluid pump and/or and may be adapted to control vehicle operation accordingly. Specific control configurations and parameters, and sensors, valve locations and systems in accordance with the principles of the invention are preferably based on overall vehicle design considerations. For example, pressure, temperature and other sensors and controls may be provided to monitor tank and/or line pressures and temperatures, to start, stop and adjust fluid flow, fan speed and duration, and other parameters associated with a proper operating protocol of the ejector pump and vehicle tank or valve system for refilling and consumption of pressurized fuel in the course of vehicle operation.

Figure 4B:
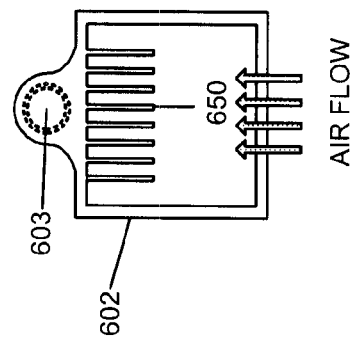
FIG. 4A, FIG. 4B, FIG. 4C, FIG. 4D, FIG. 4E and FIG. 4F show a circulating gas flow cooling line circuit disposed within a vehicle frame component and examples of cooling fin radiator configurations disposed within and on a vehicle frame assembly or fuel tank sub assembly.
Figure 4C:
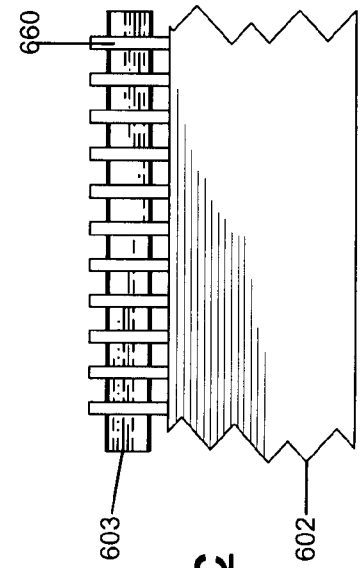
Figure 4A:
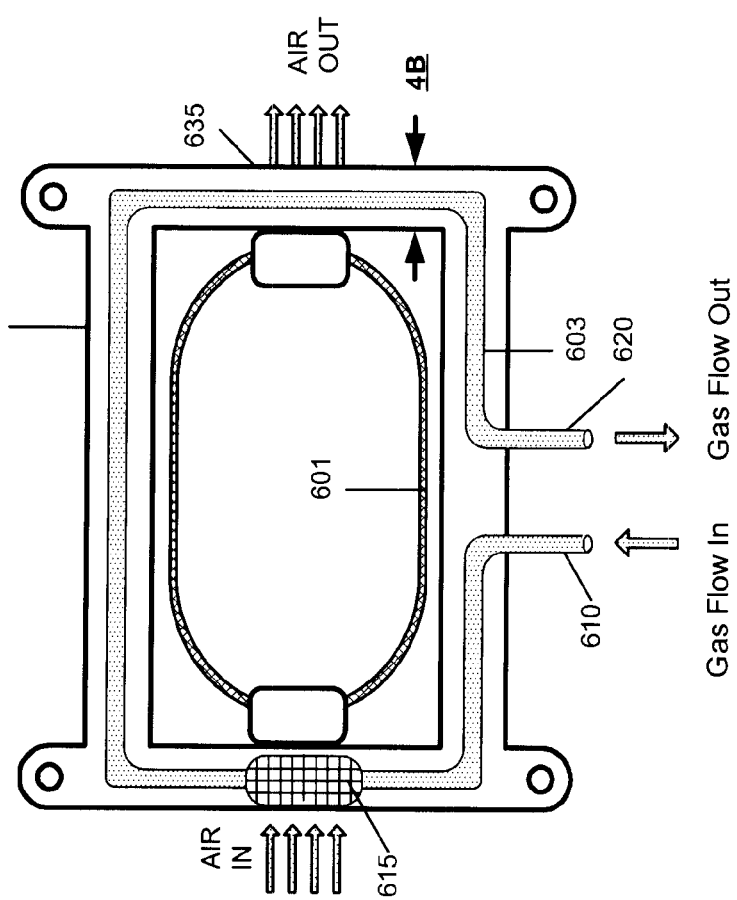
Figure 4E:
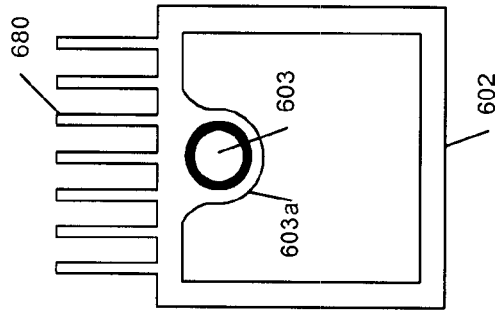
Figure 4F:
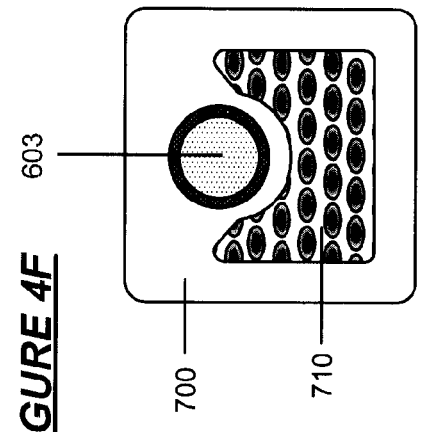
Figure 4D:
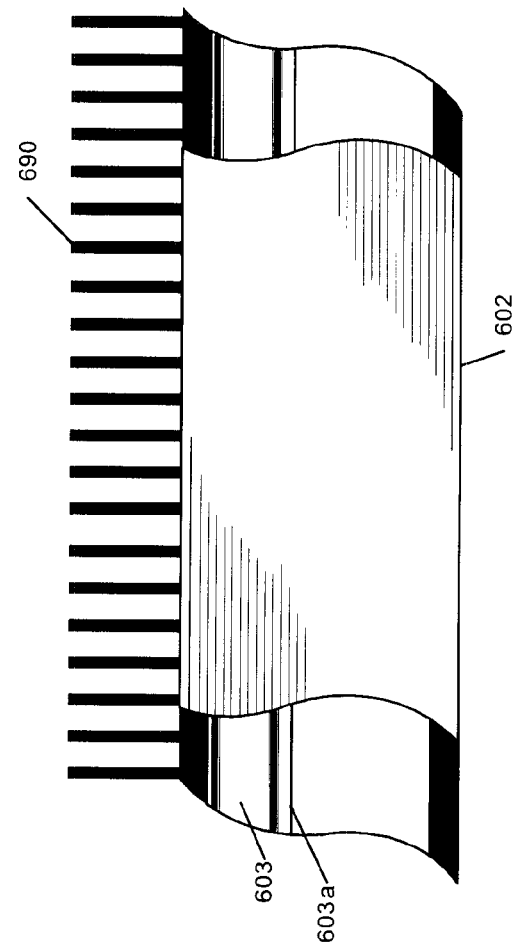

With reference to the embodiments discussed above as examples, the heat exchanger 7 shown in the embodiments in FIG. 1, FIG. 2A, FIG. 2B, FIG. 2C, FIG. 2D and FIG. 3 may be supplemented or replaced by the vehicle sub frame cooling systems shown in FIG. 4A, FIG. 4B, FIG. 4C, FIG. 4D, FIG. 4E and FIG. 4F. FIG. 4A shows a circulating gas flow cooling line circuit 603 disposed within a vehicle frame component 602 surrounding tank 601 for circulating the gas about the tank sub frame. Frame cooling media, which will typically be air, is received in frame inlet 615 and exhausted through an outlet which may include a fan 635 or other active means for removing heat from the gas in line 603. In a closed cooling circuit, gas flows within a continuous circuit from the fuel tank circulating system through an inlet and outlet wherein "Gas Flow In" 610 is matched with the heat exchanger connection 6; "Gas Flow Out" from the frame radiator 620 is matched with heat exchanger connection 8 and the gas returns to the tank gas circulation circuit. (Except as identifying flow in either direction, "in" and "out" designate the end connections of the circuit where the internal tank coils are connected to the radiator. Flow direction is not critical.) The heat from line 603 is optionally radiated externally by air circulating in the frame driven by fan 635. In the absence of an air flow system, the frame body itself may be utilized as a heat sink for radiating or absorbing heat. The circulating gas flow circuit tube 603 may be formed as an extruded or molded interior conduit; however, it is preferable, whether the tube is within, upon, or otherwise a component of the sub frame assembly, that the gas circulation tube be a separate tube inserted within the frame assembly formed from a high conductivity high strength material such as a stainless steel alloy SUS, copper or aluminum. FIG. 4D and FIG. 4E show an example wherein the gas circulation pipe 603 is installed within a cavity 603*a* in the frame 602 interior and radiator fins are transverse to the frame, FIG. 4D and parallel to the frame, FIG. 4E. FIG. 4F illustrates a cross section of a sub frame assembly 700 with gas flow conduit therein 603 including a melting/solidifying media such as naphthalene 710 as a component of the heat exchange system. See Gas Cooling Method Using a Melting/Solidifying Media for High Pressure Storage Tanks for Compressed Natural Gas or Hydrogen, Ser. No. 11/381,005 filed on May 1, 2006. Thus there is provided an apparatus wherein the compression heat of refueling of a high pressure storage tank is evacuated from the interior of the tank in which a gas circulating within the tank passes through an ejector pump powered by the mechanical energy of the refueling gas as the gas traverses from the high pressure refuel depot to the storage tank and the circulating gas absorbs the refueling heat and carries the heat to a cooling system before the gas is introduced into the tank for storage.

Figure 5A:
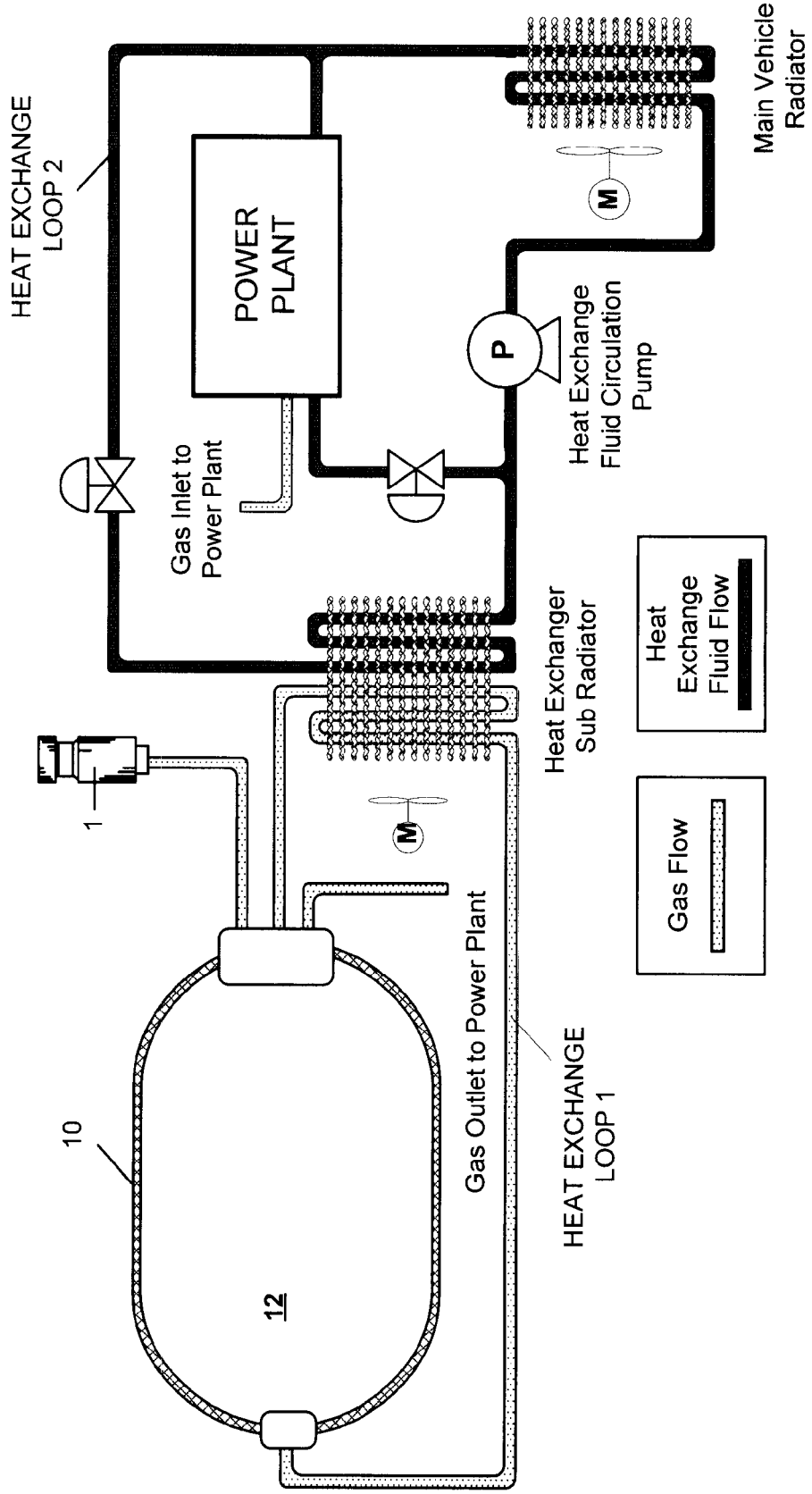
FIG. 5A shows a circulating coolant system wherein a fuel tank system heat exchanger sub radiator conveying heat from within the fuel tank is thermally interconnected to a main or sub radiator system in the vehicle that is operated with a circulating coolant through a powered pump and interconnected with the vehicle's power plant.
Figure 5B:
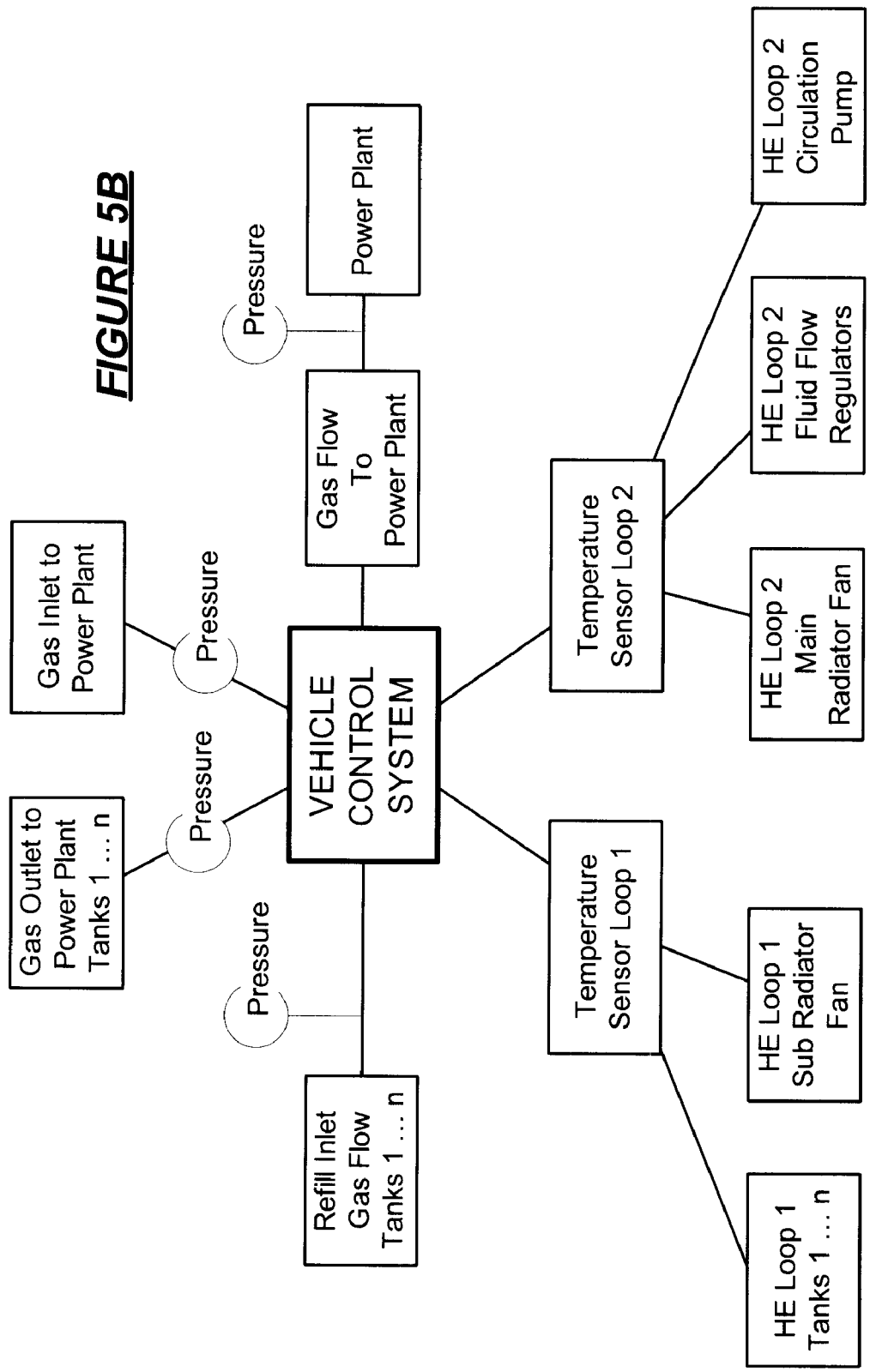
FIG. 5B shows a vehicle control system for the circulating coolant depicted in FIG. 5A interconnected with the vehicle's power plant.
Figure 6:
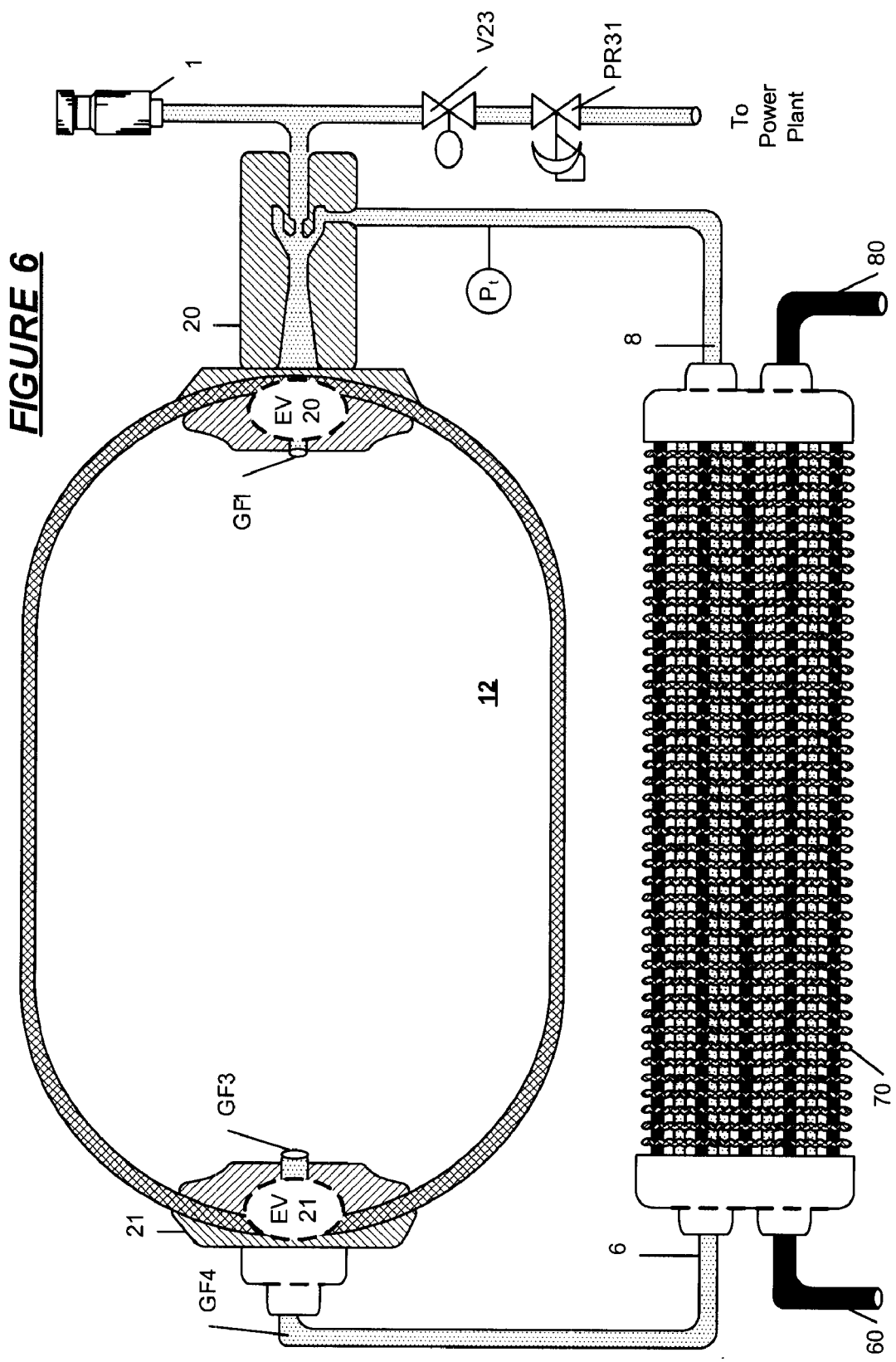
FIG. 6 shows a cooling system with a thermally interconnection to a sub radiator system through a separate cooling loop.

An further embodiment is illustrated in FIG. 5A. A circulating gas coolant system as described herein is in a closed circuit leading to a fuel tank system heat exchanger sub radiator (Heat Exchange Loop 1) that conveys the heat from within the fuel tank by a thermally interconnection to the main vehicle radiator cooling system or a vehicle sub system (Heat Exchange Loop 2) that operates with a circulating coolant that passes through a powered pump and is interconnected with the vehicle's power plant. In FIG. 5A, an interconnection from the fuel tank interior to the power plant is not specifically shown, although its presence is implicit. FIG. 5B shows a vehicle control system for the circulating coolant depicted in FIG. 5A interconnected with the vehicle's power plant. FIG. 6 shows a cooling system with a thermally interconnection to a sub radiator system 70 through a separate cooling loop 60 and 80. The valve systems, otherwise shown in the drawings at both ends of the tank bosses or end caps 20 and 21 are illustrated in FIG. 6 as valves embedded in the structure of the respective end caps designated by EV 20 and EV 21.

In all instances described herein, it is assumed that during the state of refueling, the outlet valves for each tank are closed; and during the instance of consumption, the inlet valves for each tank are closed and the cooling fluid correspondingly circulated in a manner typically monitored and controlled by a vehicle operation system. The on board vehicle tank system may include a plurality of on board tanks that may have a filling sequence wherein all tanks are filled in parallel simultaneously or all tanks are filled separately in a series order essentially one at a time.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A storage tank for a high pressure gas wherein the tank is refueled under high pressure at a refueling depot via a refilling line directing gas flow from the depot to the tank, wherein 1) a heat absorbent media circulates within the tank and absorbs the heat of compression resulting from the refueling of the tank, 2) the heat absorbed is conducted in a circulation system to a heat exchanger external to the tank whereby the absorbed heat is exhausted from the tank to an environment external to the tank, and 3) an ejector pump is interposed between the high pressure gas depot refilling line and the tank to power the circulation system.

2. The apparatus of claim 1 wherein the ejector pump is a Venturi pump interconnected in the circuit conduit system from a refuel gas inlet to the circulation system to the external heat exchanger.

3. The apparatus of claim 1 wherein the circulation system includes an auxiliary blower system for cooling the heat absorbent media.

4. The apparatus of claim 1 wherein the external heat exchanger is selected from at least one of a radiator, a heat sink and a coolant media.

5. The apparatus of claim 4 wherein the external heat exchanger is thermally interconnected with an auxiliary blower system.

6. The apparatus of claim 1 wherein the external heat exchanger includes a first loop gas flow circuit passing through a radiator that is thermally interconnected with a vehicle power plant radiator system that includes a circulating coolant fluid.

7. Apparatus in accordance with claim 1 comprising a loop fluid circuit having means for absorbing heat comprising a heat absorber flowing in the loop in a fluid circulation circuit within the tank, wherein heat absorbed by the absorber is transferred to the fluid circulating circuit to the external heat exchanger where the heat is disposed of and the fluid is thereafter recirculated to the tank interior.

8. Apparatus in accordance with claim 1 wherein the heat exchanger is a radiator comprising 1) heat disposing elements on a vehicle frame assembly and 2) a fluid circulation conduit within vehicle frame assembly proximate the heat disposing elements.

9. An on board vehicle tank system in accordance with any one or more of claim 1 or claim 2 or claim 3 or claim 4 or claim 5 or claim 6 or claim 7 or claim 8 including a plurality of on board tanks.

10. Apparatus in accord with claim 9 wherein the filling sequence for the plurality of tanks is 1) all tanks are filled in parallel simultaneously, or 2) all tanks are filled separately in a series order essentially one at a time.

11. A cooling system for a high pressure gas storage tank wherein the tank is refueled under high pressure comprising a loop defined by 1) a gas flow circuit within the tank that absorbs the heat of compression resulting from the refueling of the storage tank, 2) a radiator external to the tank whereby the heat absorbed in the loop is exhausted from the tank to an environment external to the tank, and 3) a pressure powered ejector pump producing a Venturi jet interposed between a high pressure gas depot refilling line and the tank, the ejector pump having a suction inlet and an outlet to the storage tank powering the gas flow circuit.

12. Apparatus of claim 1 wherein the heat absorbent is the refill gas.

13. Apparatus of claim 12 wherein, after the refill gas circulating within the loop is cooled to a predetermined temperature, or the tank is filled with a predetermined quantity of gas, circulation of the gas terminates, gas flow from the depot terminates, and the cooled gas is thereupon stored in the tank.

14. Apparatus in accordance with claim 12 wherein the radiator comprises 1) heat disposing elements on a vehicle frame assembly and 2) a fluid circulation conduit within the vehicle frame assembly proximate the heat disposing elements.

15. An on board vehicle tank system in accordance with claim 12 including a plurality of on board tanks.

16. Apparatus in accord with claim 15 wherein all tanks are filled simultaneously in parallel.

17. Apparatus in accord with claim 15 wherein all tanks are filled separately in a series order one at a time.

18. A cooling system for a high pressure gas storage tank wherein at least one tank is refueled under high pressure comprising a loop defined by 1) a gas flow circuit within the tank that absorbs the heat of compression resulting from the refueling of the storage tank, 2) a radiator external to the tank whereby the heat absorbed in the tank is exhausted from the tank to an environment external to the tank, and 3) a pressure powered ejector pump producing a Venturi jet interposed between a high pressure gas depot refilling line and the tank, the ejector pump having a suction inlet and an outlet to the storage tank that powers the gas flow circuit, wherein the heat absorbent media is the refill gas and, after the refill gas circulating within the loop is cooled to a predetermined temperature, or the tank is filled with a predetermined quantity of gas, circulation of the gas terminates, gas flow from the depot terminates, and the cooled gas is thereupon stored in the tank.

19. Apparatus in accord with claim 18 comprising a plurality of tanks wherein the tanks are filled simultaneously in parallel.

20. Apparatus in accord with claim 18 comprising a plurality of tanks wherein all tanks are filled separately in a series order one at a time.

* * * * *